March 28, 1939.    K. ETZRODT    2,151,753
CIRCUIT ARRANGEMENT FOR PROTECTING ELECTRIC DISCHARGE APPARATUS SYSTEMS
Filed Nov. 21, 1936.
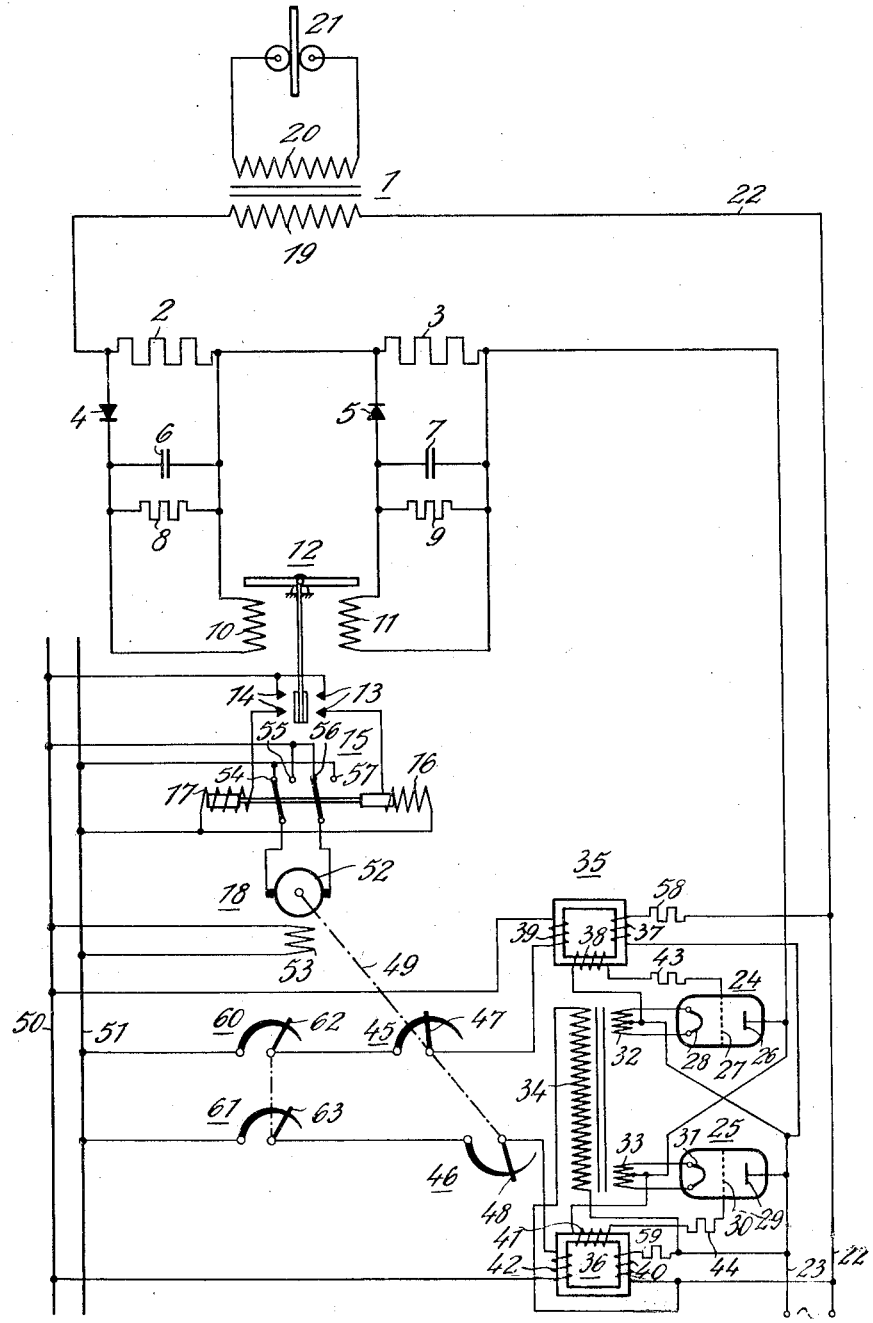
WITNESS
INVENTOR
Karl Etzrodt Patented Mar. 28, 1939

2,151,753

UNITED STATES PATENT OFFICE 2,151,753

CIRCUIT ARRANGEMENT FOR PROTECTING ELECTRIC DISCHARGE APPARATUS SYSTEMS

Karl Etzrodt, Berlin-Siemensstadt, Germany, assignor to Westinghouse Electric & Manufacturing Company, East Pittsburgh, Pa., a corporation of Pennsylvania Application November 21, 1936, Serial No. 112,059
In Germany November 22, 1935

15 Claims. (Cl. 250—27)

My invention relates to a circuit arrangement for protecting electric discharge apparatus.

If inductive alternating-current consuming apparatus, supplied through anti-parallel connected discharge devices, is periodically switched in and out as is, for instance, the case with the known seam welding machines, a direct-current component may under circumstances occur in the circuit in which the current consuming apparatus is inserted, i. e., in the case of seam welding machines in the primary circuit of the welding transformer. The direct-current component is superimposed on the alternating current and thus causes a polarization of the inductive current consuming apparatus. This polarization does not completely disappear during the switching-out period and upon the next switching-in increases, therefore, to a higher value. This is repeated until the polarization finally reaches a high value so high that inductivity of the current consuming apparatus has practically disappeared, and there is a short circuit in the system.

The occurrence of this direct-current component in the circuit in which the current consuming apparatus is inserted may have different causes. If, for instance, the electric discharge devices are not completely controlled, the conducting period of one discharge device, by reason of inaccuracies in the control may extend over a larger portion of the half cycle than is the case with the other discharge device. In this manner, a greater electric current is conveyed in one direction than in the other, and therefore a direct-current component is present. Another reason for the occurrence of a direct-current component may, for instance, lie in the fact that the ignition of the discharge devices does not take place at such a moment that a steady current curve can be immediately attained, but the current curve is displaced at the beginning to one side with respect to the zero line (rush effect), thus causing a direct-current component to occur in the circuit in which the current consuming apparatus is inserted. A fixed timing of ignition, which would yield an approximately steady current, is not in general possible, since the moment at which the ignition takes place depends upon the phase displacement between the current and the voltage of the current consuming apparatus. The phase displacement is under certain circumstances subjected to rapid changes. In the case of seam welding machines it is essentially influenced for instance, by the nature of the material, changes in the electrode pressure etc.

The object of the present invention is to prevent the occurrence of unduly high direct currents in the circuit including the current consuming apparatus of electric discharge systems of the above indicated character and thus to protect the electric discharge devices from damage. According to the invention a direct-current or direct-current voltage component occurring in the circuit including the current consuming apparatus acts on the control circuit of one or of both of the anti-parallel connected electric discharge devices in such manner that the control of the electric discharge devices is varied to decrease the direct-current component in the circuit including the current consuming apparatus. If vapor electric discharge devices are employed, the direct-current component in the circuit including the current consuming apparatus may be caused to disappear in a simple manner by timing the ignition of the discharge devices. This operation may be superimposed on the other controlling operations which function to displace the ignition points. The connection according to the invention may, therefore, be also employed in systems in which the ignition of the electric discharge devices is varied in accordance with other operating magnitudes. It is immaterial which apparatus supplying control voltages to the discharge devices is employed. To realize the inventive idea it might be, however, particularly advantageous to employ a so-called static control, which, for instance, operates with grid transformers polarized by direct current and energized by alternating current up to the region of high saturation. In this case, the direct-current polarization of the control voltage transformer may be influenced by the direct-current component of the circuit including the current consuming apparatus and the ignition of electric discharge apparatus may thus be controlled.

In the accompanying drawing an embodiment of my invention is shown diagrammatically. In this view 21 denotes the electrodes of a resistance seam welding machine connected to the secondary winding 20 of the welding transformer 1. The primary winding 19 is connected to one pole of a suitable alternating current power source through the conductor 22. The other pole of the power source is connected to the conductor 23. For controlling the current by means of the transformer winding 19, two vapor electric devices 24 and 25 are employed, each comprising an anode 26 and 29, a cathode 28 and 31 and a control grid 27 and 30 respectively. In this case the anode of one device is connected to the cathode of the other and vice versa. Accordingly, the conductor 23 is connected to the anode 29 of the discharge device 25 and with the cathode 28 of the discharge device 24, whereas the anode 26 and the cathode 31 are connected to one terminal of the transformer winding 19 through the resistances 2 and 3. The conductors connected to the cathodes extend to the center points of the transformer windings 32 and 33 serving to heat the cathodes. These windings are arranged on a common iron core together with the primary winding 34 connected to the conductors 22 and 23.

The grid voltages for the discharge devices 24 and 25 are produced by the highly saturated grid transformers 35 and 36. Each of these grid transformers is provided with three windings, i. e., the alternating-current exciting winding 37 and 40 respectively connected to the supply circuit 22, 23; the grid winding 38 and 41 respectively lying between the grid and the cathode of the corresponding discharge devices and a direct-current winding 39 and 42 respectively. So that the current in the alternating-current exciting windings 37 and 40 may retain a sine shape notwithstanding the high saturation of the iron core by reason of which the magnetic flux does not vary sinusoidally, the impedances 58 and 59 respectively are connected in series with the windings 37 and 40. The resistance of the impedances is great compared to the resistance of the exciting winding in question.

The operation of the grid transformers is as follows: By reason of the high saturation of the iron, a reversal of the magnetic flux occurs only in the moment in which the resultant excitation, which is composed of the sinusoidal alternating-current component and the direct-current component, passes through the zero value. It is only at this moment that a voltage impulse is induced in the grid winding. The positive voltage impulses serve as ignition voltage impulses for the discharge devices 24 and 25 respectively It will be apparent that by the adjustment of the direct-current excitation the moment at which the resultant excitation passes through the zero value may be adjusted within wide limits. It is therefore also possible to control at will the position of phase of the ignition voltage impulse for the discharge devices 24 and 25 by adjusting the exciting direct current for a constant exciting alternating current. To prevent unduly high grid currents the ohmic resistances 43 and 44 are connected in series with the control grids.

The control of the exciting direct current in the windings 39 and 42 respectively is effected with the aid of the rheostats 45 and 46 which are inserted between the exciting windings and the direct-current auxiliary supply circuit 50, 51. The movable contacts 47 and 48 of both rheostats are so connected to each other and to the adjusting motor 52 that, as soon as the adjusting motor 52 rotates in the one or the other direction, the resistance in the circuit of one exciting winding steadily increases, whereas the resistance in the circuit of the other exciting winding decreases, thus causing an ignition of the discharge devices 24 and 25 to take place at different times. To render possible an arbitrary timing of ignition of the discharge devices, the rheostats 60 and 61 are connected in series with the exciting windings 39 and 42 respectively the movable contacts 62 and 63 of the rheostats being connected with each other in such manner as to cause a simultaneous ignition of both discharge devices. The resistances 45 and 46 serve, consequently, only to automatically correct the timing of ignition, in case a direct-current component in the primary circuit of the welding transformer 1 should occur by reason of inaccuracies in the control or for other reasons.

To bring about the automatic adjustment of the resistances 45 and 46 upon occurrence of such a direct-current component two equal resistances 2 and 3 are connected in series in the primary supply conductor of the welding transformer 1. Each of these resistances is connected to an exciting coil 10 and 11 respectively of a balance beam relay 12 through an electric valve 4 and 5 respectively, such as a dry rectifier. The valves 4 and 5 are connected in such manner that one valve only permits the passage of the positive half cycle, whereas the other only the negative half cycle of the voltage drop in the resistances 2 and 3 respectively. Furthermore, chocking means consisting of the capacitors 6 and 7 respectively and the resistances 8 and 9 respectively are connected in parallel relation to the exciting coils of the balance beam relay 12 so that the exciting coils 10 and 11 are only traversed by direct current. So long as the curve of the alternating current flowing in the primary winding 19 is symmetrical with respect to the zero axis, the direct-current voltages occurring across the resistances 8 and 9 are equal and the balance beam relay 12 remains, therefore, in the central position. However, as soon as a direct-current component occurs in the circuit of the transformer winding 19, and there is a displacement of the alternating current in one direction, the voltage of one resistance, for instance of the resistance 8, becomes greater, whereas the voltage of the other resistance, for instance, of the resistance 9 becomes smaller. Consequently, the balance beam relay 12 is actuated and bridges the pair of contacts 13. In this manner, the exciting coil 16 of the throw-over switch 15 is connected to the direct-current supply circuit 50, 51, and the throw-over switch 15 connects the armature winding 52 of the motor 18 to the supply circuit 50, 51 through the contacts 55 and 57. If the direct-current voltage drop in the resistance 9 is greater than that in the resistance 8, the balance beam relay 12 closes its contacts 14, thus energizing the coil 17 of the throw-over switch 15 and connecting the armature winding 52 to the direct-current supply circuit 50, 51 through the contacts 54 and 56 with reversed polarity. Care must be taken to see that the throw-over switch 15 returns to its mid-position and deenergizes the armature winding 52 if the balance beam relay 12 also assumes its central position. The exciting winding 53 of the motor 52 is always connected to the direct-current supply circuit 50, 51.

The direction of rotation of the motor 52 must be so chosen—if the direct-current voltage drop in one of the resistances 8 and 9 respectively is greater than that occurring in the other resistance—that the ignition of the discharge apparatus 24 or 25 that permits the passage of the half cycle of the alternating current which opposes the direct-current component in the resistances 2 and 3, occurs too soon, whereas the ignition of the other discharge apparatus occurs too late.

It is evident that instead of the arrangement shown for eliminating the direct-current component other arrangements may be employed, such as, for instance, an ammeter of the moving coil type provided with relay contacts and inserted in the primary circuit of the transformer 1. Also any other suitable arrangement may be chosen for the grid control of the discharge apparatus 24 and 25. Thus, for instance, two induction regulators may be provided which are so connected as to operate in opposition and are driven by the adjusting motor 52.

I claim as my invention:

1. Apparatus for supplying a load with alternating current comprising means for supplying current of one polarity to said load, means for controlling the magnitude of the current supplied by said current supply means, means for supplying current of the opposite polarity to said load, means for controlling the magnitude of the current supplied by the last said current supply means and means responsive to the flow of a direct current component through said load for adjusting said first-named and said last-named controlling means.

2. Apparatus for supplying a load with alternating current comprising means for supplying current of one polarity to said load, means for controlling the magnitude of the current supplied by said current supply means, means for supplying current of the opposite polarity to said load, means for controlling the magnitude of the current supplied by the last said current supply means and means responsive to the flow of a direct current component through said load for so adjusting said first-named and said last-named controlling means, that said direct current component is suppressed.

3. Apparatus for supplying a load with alternating current comprising means for supplying current of one polarity to said load, means for controlling the magnitude of the current supplied by said current supply means, means for supplying current of the opposite polarity to said load, means for controlling the magnitude of the current supplied by the last said current supply means, means responsive to a direct current component of one polarity for so adjusting the first said controlling means that said component is suppressed and means responsive to a direct current component of the opposite polarity for so adjusting the last said controlling means that the last said component is suppressed.

4. Apparatus for supplying a load with alternating current comprising means for supplying current of one polarity to said load, means for controlling the magnitude of the current supplied by said current supply means, means for supplying current of the opposite polarity to said load, means for controlling the magnitude of the current supplied by the last said current supply means, means responsive to a direct current component of the first said polarity for so adjusting the last said controlling means that said component is suppressed and means responsive to a direct current component of the last said polarity for so adjusting the first said controlling means that the last said component is suppressed.

5. Apparatus according to claim 1 characterized by the fact that the responsive means includes a pair of resistors in series with the load, means in circuit with one resistor for deriving a potential corresponding to the first named polarity and means in circuit with the other resistor for deriving a potential of the last-named polarity.

6. Apparatus according to claim 1 characterized by the fact that the responsive means includes a pair of resistors in series with the load, means in circuit with one resistor for deriving a potential corresponding to the first named polarity and means in circuit with the other resistor for deriving a potential of the last-named polarity, each said means in circuit with the resistors including a rectifier that functions to pass current only of the corresponding polarity.

7. Apparatus for supplying a load incorporating as a portion thereof a magnetically saturable electrical element with alternating current comprising means for supplying current of one polarity to said load, means for controlling the magnitude of the current supplied by said current supply means, means for supplying current of the opposite polarity to said load, means for controlling the magnitude of the current supplied by the last said current supply means and means responsive to the flow of a direct current component through said load for adjusting said first-named and said last-named controlling means.

8. Apparatus for supplying a load with alternating current from a sorce of alternating current comprising a first electric discharge path having a control electrode and a plurality of principal electrodes in circuit with said source and said load, means for impressing potentials between said control electrode and one of said principal electrodes to render said discharge path conductive at predetermined instants in alternate half periods of said source, a second discharge path having a control electrode and a plurality of principal electrodes in circuit with said source and said load, means for impressing potentials between the control electrode and a principal electrode of said second discharge path to render said second discharge path conductive at predetermined instants in the other half periods of said source and means responsive to the flow of a direct current component in the alternating current flowing through said load for varying the potential impressed by at least one of said potential impressing means.

9. Apparatus for supplying a load with alternating current comprising means for supplying current of one polarity to said load, means for controlling the magnitude of the current supplied by said current supply means, means for supplying current of the opposite polarity to said load, means for controlling the magnitude of the current supplied by the last said current supply means and means responsive to the flow of a direct current component through said load for adjusting at least one of said controlling means.

10. Apparatus for supplying a load with alternating current from a source of alternating current comprising a first electric discharge path having a control electrode and a plurality of principal electrodes in circuit with said source and said load, means for impressing potentials between said control electrode and one of said principal electrodes to render said discharge path conductive at predetermined instants in alternate half periods of said source, a second discharge path having a control electrode and a plurality of principal electrodes in circuit with said source and said load, means for impressing potentials between the control electrode and a principal electrode of said second discharge path to render said second discharge path conductive at predetermined instants in the other half periods of said source and means responsive to the flow of a direct current component in said load for varying the potential impressed by said potential impressing means.

11. Apparatus for supplying a load with alternating current from a source of alternating current comprising a first electric discharge path having a control electrode and a plurality of principal electrodes in circuit with said source and said load, means for impressing potentials between said control electrode and one of said principal electrodes to render said discharge path conductive at predetermined instants in alternate half periods of said source, a second discharge path having a control electrode and a plurality of principal electrodes in circuit with said source and said load, means for impressing potentials between the control electrode and a principal electrode of said second discharge path to render said second discharge path conductive at predetermined instants in the other half periods of said source and means responsive to the flow of a direct current component in said load for varying the potential impressed by said potential impressing means in such manner that said direct current component is suppressed.

12. Apparatus for supplying a load with alternating current comprising means for supplying current of one polarity to said load, means for controlling the magnitude of the current supplied by said current supply means, means for supplying current of the opposite polarity to said load and means responsive to the flow of a direct current component through said load for adjusting said controlling means.

13. Apparatus for supplying a load with alternating current comprising means for supplying current of one polarity to said load, means for controlling the magnitude of the current supplied by said current supply means, means for supplying current of the opposite polarity to said load and means responsive to the flow of a direct current component through said load for adjusting said controlling means in such manner that said component is suppressed.

14. Apparatus according to claim 8 characterized by the fact that the discharge paths have the property of asymmetric conductivity and are connected in anti-parallel between the source and the load.

15. Apparatus according to claim 8 characterized by the fact that the potentials impressed by the potential impressing means are of peaked wave form.

KARL ETZRODT.